US012026110B2

(12) United States Patent
Cornett et al.

(10) Patent No.: US 12,026,110 B2
(45) Date of Patent: Jul. 2, 2024

(54) DYNAMIC INTERRUPT PROVISIONING

(71) Applicant: Intel Corporation, Santa Clara, CA (US)

(72) Inventors: Linden Cornett, Portland, OR (US); Eliel Louzoun, Jerusalem (IL); Anjali Singhai Jain, Portland, OR (US); Ronen Aharon Hyatt, Haifa (IL); Danny Volkind, Nesher (IL); Noam Elati, Zichron yaakov (IL); Nadav Turbovich, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 16/814,710

(22) Filed: Mar. 10, 2020

(65) Prior Publication Data

US 2020/0210359 A1 Jul. 2, 2020

(51) Int. Cl.
*G06F 13/24* (2006.01)
*G06F 9/48* (2006.01)
*G06F 13/42* (2006.01)

(52) U.S. Cl.
CPC .......... *G06F 13/24* (2013.01); *G06F 9/4812* (2013.01); *G06F 13/4282* (2013.01); *G06F 2213/0026* (2013.01)

(58) Field of Classification Search
CPC .... G06F 13/24; G06F 9/4812; G06F 13/4282; G06F 2213/0026
USPC ..................................... 710/15, 48, 261, 266
See application file for complete search history.

(56) References Cited

U.S. PATENT DOCUMENTS

| 2002/0085493 | A1* | 7/2002 | Pekkala | .................. H04L 47/30 370/252 |
| 2005/0228921 | A1 | 10/2005 | Sethi et al. | |
| 2006/0195848 | A1* | 8/2006 | Arndt | .................. G06F 9/45537 718/104 |

(Continued)

FOREIGN PATENT DOCUMENTS

KR 20190108038 A 9/2019

OTHER PUBLICATIONS

International Search Report and Written Opinion for PCT Patent Application No. PCT/US20/65434, dated Apr. 5, 2021, 11 pages.

(Continued)

*Primary Examiner* — Idriss N Alrobaye
*Assistant Examiner* — Henry W Yu
(74) *Attorney, Agent, or Firm* — Compass IP Law PC

(57) ABSTRACT

Examples described herein relate to a device indicating a number of available interrupt messages that is more than physical resources available to store the available interrupt messages and allocating one or more physical resources to provide one or more interrupt messages based on allocation of the one or more interrupt messages to a destination entity. The destination entity can request a maximum permitted allocation of interrupt messages regardless of interrupt message use level. The destination entity can request a maximum permitted allocation of interrupt messages regardless of interrupt message use level and allocate the requested maximum permitted allocation of interrupt messages for use in a configuration region of a device. However, based on unavailability of a physical resource to store a first interrupt message, allocation of the first interrupt message to a destination entity may not be permitted.

20 Claims, 9 Drawing Sheets

(56) References Cited

U.S. PATENT DOCUMENTS

| | | | | |
|---|---|---|---|---|
| 2011/0289242 | A1* | 11/2011 | Srinivasan | G06F 13/102 |
| | | | | 710/22 |
| 2012/0131232 | A1* | 5/2012 | Brownlow | G06F 13/4221 |
| | | | | 710/10 |
| 2013/0080673 | A1 | 3/2013 | Feehrer et al. | |
| 2013/0318334 | A1* | 11/2013 | Waskiewicz, Jr. | G06F 1/3203 |
| | | | | 712/244 |
| 2014/0006668 | A1* | 1/2014 | Chew | G06F 13/24 |
| | | | | 710/269 |
| 2014/0156894 | A1 | 6/2014 | Tsirkin et al. | |
| 2014/0229647 | A1 | 8/2014 | Tsirkin et al. | |
| 2014/0250202 | A1 | 9/2014 | Hefty et al. | |
| 2016/0034418 | A1* | 2/2016 | Romem | H04L 12/6418 |
| | | | | 709/212 |
| 2016/0188465 | A1* | 6/2016 | Almasi | G06F 21/78 |
| | | | | 711/6 |
| 2018/0307521 | A1* | 10/2018 | Pinto | G06F 12/0238 |
| 2021/0034390 | A1* | 2/2021 | Arroyo | G06F 9/5083 |

OTHER PUBLICATIONS

"PCI Express® Base Specification Revision 3.0", PCI Express, Nov. 10, 2010, 860 pages.

"Xilinx Answer 58495 Xilinx PCI Express Interrupt Debugging Guide", Xilinx, Jan. 15, 2014, 18 pages.

BSODtutorials, "Understanding PCI Configuration Space", Windows Internals, System Security, Theoretical Computer Science and Debugging., https://bsodtutorials.blogspot.com/2014/01/understanding-pci-configuration-space.html, Jan. 23, 2014, 8 pages.

Garrison, Justin, "What Is a Virtual Machine Hypervisor?", How-to-Geek, https://www.howtogeek.com/66734/htg-explains-what-is-a-hypervisor/, Sep. 28, 2016, 6 pages.

Intel, "Intel® Arria® 10 Avalon® Streaming (Avalon-ST) Interface with SR-IOV PCIe Solutions User Guide, 5.9. Implementing MSI-X Interrupts", Updated for Intel® Quartus® Prime Design Suite: 18.0, Dec. 19, 2019, 2 pages.

Intel, "Intel® FPGA P-Tile Avalon® Streaming (Avalon-ST) IP for PCI Express User Guide", Updated for Intel® Quartus® Prime Design Suite: 19.4, IP Version: 1.1.0, Jan. 16, 2020, 218 pages.

Intel, "Intel® Scalable I/O Virtualization Technical Specification", Jun. 2018, 27 pages.

Intel, "PCI-SIG SR-IOV Primer An Introduction to SR-IOV Technology", Intel® LAN Access Division, Revision 2.5, Jan. 2011, 28 pages.

Legros, Philippe, "Why using Single Root I/O Virtualization (SR-IOV) can help improve I/O performance and Reduce Costs", https://www.design-reuse.com/articles/32998/single-root-i-o-virtualization.html, Feb. 17, 2020, 22 pages.

LeVasseur, Joshua, et al., "Standardized but Flexible I/O for Self-Virtualizing Devices", https://www.usenix.org/legacy/event/wiov08/tech/full_papers/levasseur/levasseur_html/, Feb. 17, 2020, 9 pages.

Loveless, Tim, "What is SR-IOV and Why is It Important for embedded devices?", Lynx Software Technologies, https://www.lynx.com/embedded-systems-learning-center/what-is-sr-iov-and-why-is-it-important-for-embedded-devices?hs_amp=true, Oct. 7, 2019, 5 pages.

Nguyen, Tom L., et al., "The MSI Driver Guide HOWTO", https://www.kernel.org/doc/Documentation/PCI/MSI-HOWTO.txt, last revised Jul. 9, 2008, 5 pages.

Tatti, Govinda, et al., "MSI and MSI-X Implementation", PCI SIG, Sun Microsystems, Copyright © 2016, 30 pages.

* cited by examiner

600

650

DYNAMIC INTERRUPT PROVISIONING

DESCRIPTION

Message signaled interrupts (MSI) are a feature that enables a device function to request service by writing a system-specified data value to a system-specified address using, for example, a Peripheral Components Interconnect (PCI) compatible interface. MSI-X is an enhancement to MSI that can increase the number of interrupts available for use. MSI-X is described, for example, in PCI Express® Base Specification Revision 3.0 (2010).

MSI/MSI-X interrupt support is required for PCI Express devices. All PCI Express device Functions that are capable of generating interrupts must support MSI or MSI-X or both. The MSI and MSI-X mechanisms deliver interrupts by performing memory 25 write transactions. MSI and MSI-X are edge-triggered interrupt mechanisms. The MSI/MSI-X interrupts enable a Function to request service by writing a system-specified DWORD of data to a system-specified address using a Memory Write Request. Compared to MSI, MSI-X supports a larger maximum number of vectors and independent message address and data for each vector. Message Signaled Interrupt (MSI/MSI-X) mechanisms use Memory Write Requests to represent interrupt Messages. The Request format used for MSI/MSI-X transactions is identical to the Memory Write Request format defined above, and MSI/MSI-X Requests are indistinguishable from memory writes with regard to ordering, Flow Control, and data integrity. If a Function implements a TPH Requester Capability structure and an MSI-X Capability structure, the Function can optionally use the Vector Control register in each MSI-X Table Entry to store a Steering Tag. See FIG. 7-9 and Table 7-9 in PCI Express® Base Specification Revision 3.0 (2010) for vector control for MSI-X table entries.

DETAILED DESCRIPTION

Figure 1:
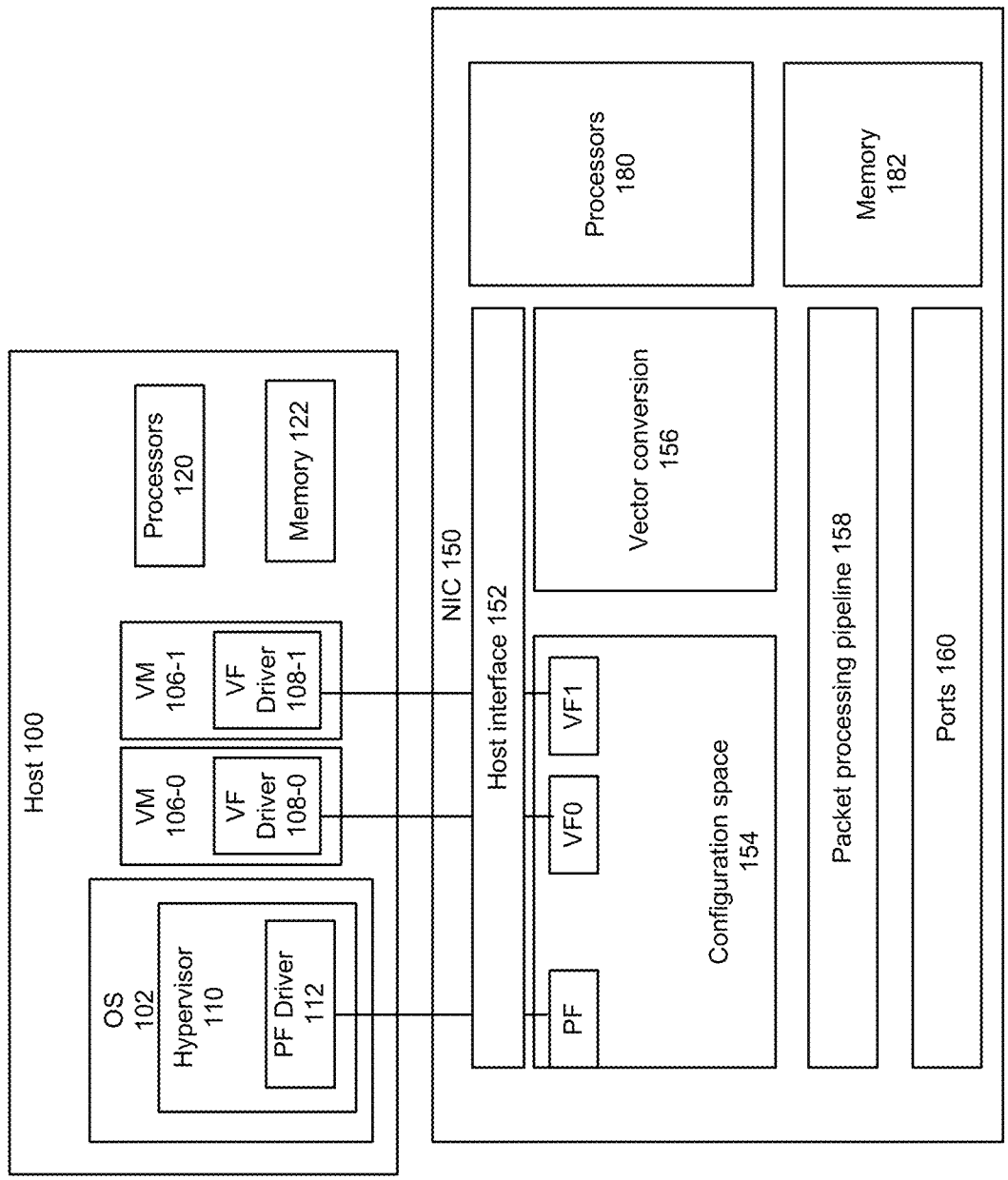
FIG. 1 depicts an example system.

Peripheral component interconnect express (PCIe) is an interface standard for connecting high-speed components. PCIe defines various interrupt types such as legacy PCI in-band interrupts, MSI and MSI-X. Currently, MSI-X permits a device to allocate up to 2048 interrupts per function.

A single-root I/O virtualization (SR-IOV) is a specification that allows a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that are capable of configuring and managing the SR-IOV functionality. For example, a PF can configure or control a PCIe device, and the PF has ability to move data in and out of the PCIe device. For example, for a network adapter, the PF is a PCIe function of the network adapter that supports SR-IOV. The PF includes capability to configure and manage SR-IOV functionality of the network adapter, such as enabling virtualization and managing PCIe VFs. A VF is associated with a PCIe PF on the network adapter, and the VF represents a virtualized instance of the network adapter. A VF can have its own PCI configuration space but can share one or more physical resources on the network adapter, such as an external network port, with the PF and other PFs or other VFs.

In some cases, the number of available PCIe MSI-X interrupt vectors or messages is established as part of PCIe enumeration. During PCIe enumeration, a Basic Input/Output System (BIOS) can perform initial enumeration (allocation) of MSI-X interrupt vectors. A BIOS can set fields in a PCIe configuration space of a PCIe device that specifies a number of available vectors (e.g., as a table size). The available MSI-X vectors to any given PCIe function (e.g., physical or virtual) can be exposed in the PCIe Base Address Register (BAR). A BAR can correspond to an address range that serves as a separate communication channel to the PCI device. A number of vectors can correspond to a table size in the configuration space. When a particular function is activated, a driver of the function (e.g., PF or VF) requests a number of vectors.

A BIOS can configure or re-configure system software at or after boot. In some examples, Extensible Firmware Interface (EFI) and/or a Universal Extensible Firmware Interface (UEFI) can be used instead or in addition to a BIOS for booting or restarting cores or processors. UEFI is a specification that defines a software interface between an operating system and platform firmware. UEFI can read from entries from disk partitions by not just booting from a disk or storage but booting from a specific boot loader in a specific location on a specific disk or storage. UEFI can support remote diagnostics and repair of computers, even with no operating system installed. A boot loader can be written for UEFI and can be instructions that a boot code firmware can execute and the boot loader is to boot the operating system(s). A UEFI bootloader can be a bootloader capable of reading from a UEFI type firmware.

After enumeration, a total number of available vectors may be fixed and a number of vectors supported by a PF and any associated VF could depend on how many PFs and VFs are enabled for the device. MSI-X vectors can be statically allocated and evenly distributed across functions (with some exceptions). For example, a PCIe enumeration can be of 1024 vectors total where 512 vectors can be allocated for PFs and 512 vectors can be allocated for VFs. In some cases, 1 PF receives 512 vectors, 2 PFs receive 256 vectors each and 4 PFs receive 128 vectors each. In some cases, for the 512 vectors for VFs, 128 VFs can be allocated 4 vectors each, 64 VFs can be allocated 8 vectors each, or 32 VFs can be allocated 16 vectors each.

However, a static allocation among PFs and VFs may not match with PF and VF uses and needs. Changing the number of advertised available vectors dynamically requires that the PCIe bus to be re-enumerated, which is a disruptive operation because a full PCIe reset of the system is needed. Time critical applications or up-time guarantees (e.g., service level agreements (SLAs)) may be violated due to system reset. For a network interface that is a PCIe connected device, the traffic into and out of the network interface will likely be disrupted.

If a function does not support enough vectors, its capabilities are limited in terms of handling different types of interrupts. An approach to providing a sufficient number of vectors is overprovisioning whereby more vectors can be available for use. MSI-X vectors use underlying memory resources and logic resources (e.g., timers). With thousands of PFs and VFs, the memory resources and configuration logic used for MSI-X vectors may be unsupportable.

Various embodiments permit interrupt vector allocation for various ranges of differentiation of interrupt causes in addition to even distribution of vectors. Various embodiments provide for dynamic adjustment to a number of vectors available for use by physical or virtual functions as needed, without requiring a system reset. For example, if a system is a device connected using PCIe to a host system and SR-IOV or Scalable I/O Virtualization (S-IOV) are supported, PFs and VFs can receive modified allocations of interrupt vectors, without requiring a system reset.

In some embodiments, a function (e.g., physical and/or virtual), in configuration space, advertises support for a maximum number of interrupt vectors. For example, where a device is a PCIe device, the function can advertise support for a maximum number of vectors under a PCIe specification. A device driver can request use of a maximum number of vectors, regardless of allocated queues or class of service, and advertise a maximum number of interrupts vectors allowed in configuration space. With MSI-X interrupts, a single function can use up to 2048 distinct interrupt request (IRQ) numbers.

However, in some cases, all advertised vectors may not have physical memory resources and a subset of the advertised vectors may be allocated physical memory resources. At runtime or after a physical or virtual function is allocated interrupt vectors, interrupt vectors are allocated physical memory space in which to write or read contents of vectors. An operating system (OS) can request a number of vectors for use by a function (e.g., PF or VF), which can provide flexibility in a number of vectors allocated to a PF or its VF(s).

Processor-executed software (e.g., software configured by hypervisor or driver) has control over what vectors are used by a function. For vectors allocated to a VF, the software dynamically assigns the physical resources to vectors, and ensures that only the vectors backed by physical resources are allocated for use by a function (e.g., PF or VF). For example, before a VF is activated, the software can determine how many vectors to allocate to the VF based on system configuration or negotiation. The PCIe device can manage a lookup of the vectors to physical memory resources.

If a virtual machine or other virtualized execution environment is migrated to another computing platform or uses another network interface, the associated vectors can be surrendered and available for use by other PFs or VFs.

FIG. 1 depicts an example system. Host system 100 can include or use various processors 120 and memory 122. Processors 120 can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Processors 120 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, CA), including the instruction(s) described herein.

Physical Functions (PFs) can be PCIe functions that are discovered, managed, and manipulated as a PCIe device. PFs have full configuration space. Through use of PF driver 112, PCIe device (e.g., NIC 150) can be configured or controlled and, the PF can copy data in and out of the PCIe device. A PF is independent and handled by software as a separate PCI Express device. Virtual Functions (VFs) are PCIe functions allowed to move data in and out of a PCIe device. A VF is attached to an underlying PF and a PF can have from zero (0) to one (1) or more VFs. In addition, PFs within the same device can each have a different number of VFs. Note that a destination entity can be a PF or VF or any type of processor-executed software or device or a peripheral device (e.g., storage controller or accelerator) that processes an interrupt vector or interrupt message. A subordinate or secondary destination entity can be a VF associated with a PF, or a peripheral device (e.g., storage controller or accelerator) in some examples.

Some embodiments use either or both of SR-IOV or S-IOV. A SR-IOV extension enables multiple virtualized execution environments (e.g., system images) to share PCIe hardware resources under a single-node system (e.g., single root complex). SR-IOV is compatible at least with specifications available from Peripheral Component Interconnect Special Interest Group (PCI SIG) including specifications such as Single Root I/O Virtualization and Sharing specification Revision 1.1 (2010) and variations thereof and updates thereto. A SR-IOV device provides a bus device function (BDF) identifier for a virtual function within a PCIe hierarchy; a unique memory address space for a virtual function (VF) within a PCIe hierarchy; a unique error logging and escalation scheme; a unique MSI/MSI-X capability for each VF within a PCIe hierarchy; and power-management capabilities for each VF within a PCIe hierarchy. In addition, SR-IOV provides the capability to discover and configure virtualization capabilities which include a number of VFs that the PCIe device will associate with a device and the type of base address register (BAR) mechanism supported by the VFs.

S-IOV is a PCIe-based virtualization technique that provides for scalable sharing across virtualized execution environments of I/O devices, such as network controllers, storage controllers, graphics processing units, and other hardware accelerators across a large number of virtualized execution environments. Unlike the coarse-grained device partitioning approach of SR-IOV to create multiple VFs on a PF, S-IOV enables software to flexibly compose virtual devices utilizing the hardware-assists for device sharing at finer granularity. Performance critical operations on the composed virtual device are mapped directly to the underlying device hardware, while non-critical operations are emulated through device-specific composition software in the host. A technical specification for S-IOV is Intel® Scalable I/O Virtualization Technical Specification, revision 1.0.

As hyper-scale models proliferate along with increasing number of processing elements on modern processors, a typical standard high-volume server is used to host an order of magnitude more of bare-metal or machine containers than traditional VMs. Many of these usages such as network function virtualization (NFV) or heterogeneous computing with accelerators require high performance hardware-assisted I/O virtualization. These dynamically provisioned high-density usages (e.g., of the order of 1000 domains) demand more scalable and fine-grained I/O virtualization solutions than required by traditional virtualization usages supported by SR-IOV capable devices. Intel Scalable IOV is a new approach to hardware-assisted I/O virtualization that enables highly scalable and high performance sharing of I/O devices across isolated domains, while containing the cost and complexity for endpoint device hardware to support such scalable sharing. Depending on the usage model, the isolated domains may be traditional VMs, machine containers, bare-metal containers, or application processes. This document primarily refers to isolated domains as VMs, but the general principles apply broadly to other domain abstractions such as containers.

Unlike the coarse-grained device partitioning approach adopted by SR-IOV to create multiple VFs on a PF, Intel Scalable IOV enables software to flexibly compose virtual devices utilizing the hardware assists for device sharing at finer granularity. Frequent (e.g., performance critical) operations on the composed virtual device are mapped directly to the underlying device hardware, while infrequent operations are emulated through device-specific composition software in the host. This is different from the existing architecture for SR-IOV devices, where only the device-agnostic PCI Express architectural resources (such as configuration space registers and MSI-X capability registers) of the virtual device are virtualized in software, and the rest of the virtual device resources (including all other MMIO) are mapped directly to the underlying VF hardware resources.

A virtualized execution environment can include at least a virtual machine, process containers, machine containers, or application processes. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Note that FIG. 1 shows a hosted implementation where hypervisor 110 runs on a host OS and uses the host OS or drivers to access hardware. In a bare metal implementation, hypervisor 110 installs directly onto host 100 and there is no OS and the hypervisor has direct access to all hardware and features. Multiple operating systems can run. Bare metal is most often used for servers because of their security and portability to move from hardware to hardware.

Operating system (OS) 102 can execute on processors 120. Hypervisor 110 can be a virtual machine manager or system software and can launch and manage virtual machines 106-0 and 106-1 as well as VF drivers 108-0 and 108-1. According to some embodiments, a processor-executed PF driver 112 can serve as a synchronization point that configures interrupt vectors allocated to various PFs and VFs. Although one PF and two VFs are shown in this example, multiple PFs and fewer or more VFs could be used. A PF can have more one or more associated VFs. In some embodiments, a separate PF driver (not shown) can be used that is to act as the synchronization point for vector allocations with no data plane operations.

According to some embodiments, any function, PF or VF, in configuration space 154 advertises support for more interrupt vectors (e.g., MSI-X vectors) than are needed for use by active or expected-to-run PFs or VFs, such as a maximum number of MSI-X vectors supported by the PCIe specification. OS 102 configured by hypervisor 110 or driver 112 can control which vectors are actually used by a PF or VF. Before a VF is active, OS 102 determines how many vectors to allocate to the VF (e.g., based on system configuration or negotiation) and then allocates physical memory backing for allocated vectors. A PF can allocate physical resources to back up the allocated vectors. OS 102 or other software, hardware or firmware can dynamically assign memory-backed vectors to functions based on system needs, and ensures that only the vectors backed by physical resources are used. Vector conversion 156 in NIC 150 can be used to convert vectors to physical addresses, as described in more detail herein.

Configuration space 154 can be a set of registers. On PCIe buses, configuration space 154 may be referred to as Extended Configuration Space. Configuration space can be mapped to a memory space of the CPU (e.g., using Enhanced Configuration Access Mechanism (ECAM)). NIC 150 can use interface 152 to communicate with host 100. In some examples, interface 152 is compliant with PCIe, although any other interface could be used.

NIC 150 can include packet processing pipeline 158, processor 180, and memory 182 for storing and processing of packets prior to transmission using ports 160 or processing of packets received through ports 160. A packet can include a formatted collections of bits that may be sent across a network, such as Ethernet frames, IP packets, TCP segments, UDP datagrams, quick UDP Internet Connections (QUIC) and so forth. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model. A packet can include a header and payload. A header can be a media access control (MAC) source and destination addresses, Ethertype, Internet Protocol (IP) source and destination addresses, IP protocol, Transmission Control Protocol (TCP) port numbers, virtual local area network (VLAN) or Multi-Protocol Label Switching (MPLS) tags, and so forth. A packet can be associated with a flow. A flow can be one or more packets transmitted between two endpoints. A flow can be identified by a set of defined tuples, such as two tuples that identify the endpoints (e.g., source and destination addresses). For some services, flows can be identified at a finer granularity by using five or more tuples (e.g., source address, destination address, IP protocol, transport layer source port, and destination port).

While an example is provided for a NIC 150, vectors can be allocated for use with any other connected device. For example, a storage device (e.g., that supports Non-volatile Memory Express (NVMe), decryption/encryption engine, graphics engine, or any other PCIe connected device can be used.

Figure 2:
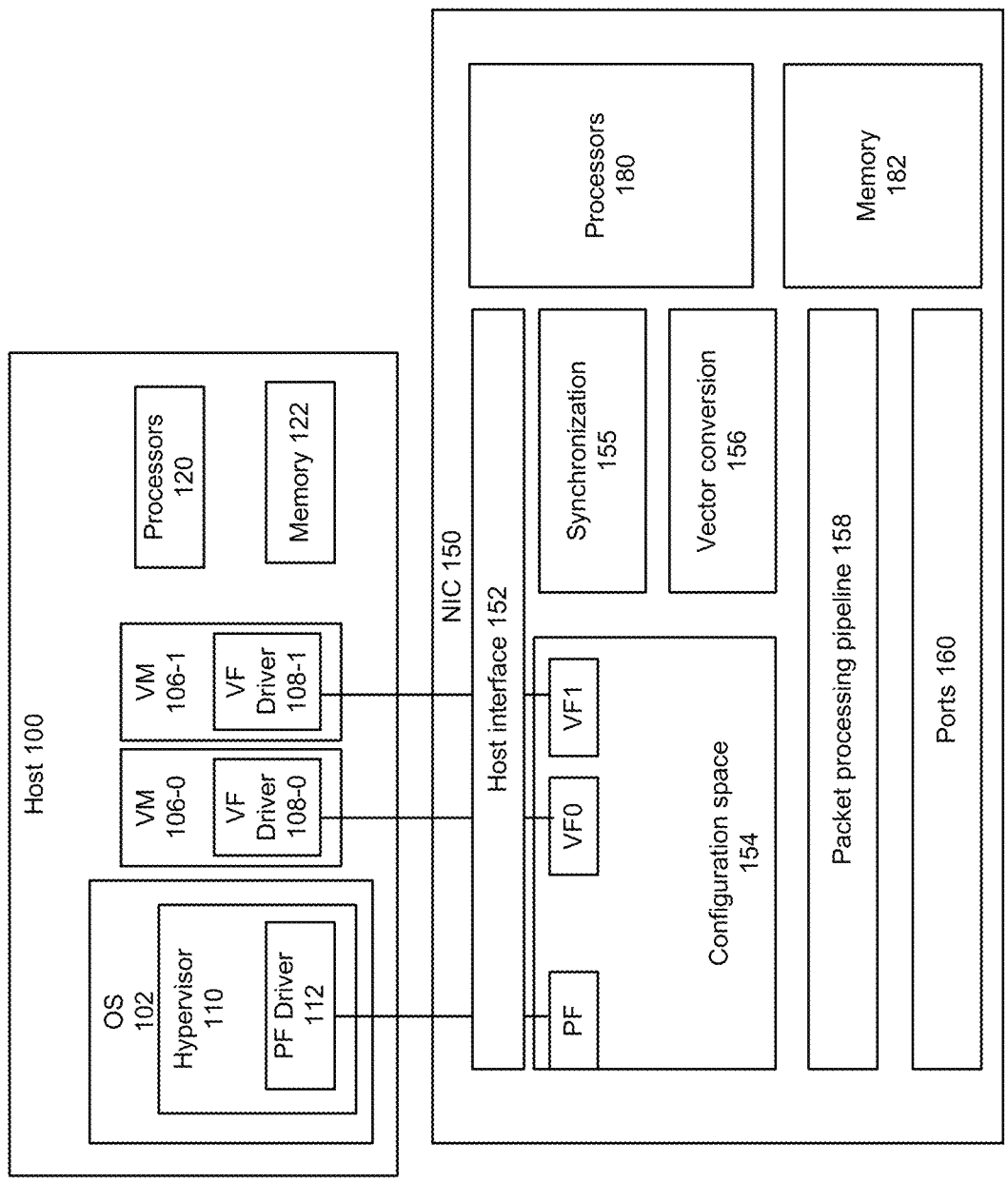
FIG. 2 depicts an example system.

FIG. 2 depicts an example system that uses a synchronization in a network interface (or other device). In this example, instead of PF driver 112 acting as a synchronization point, synchronization 155 can manage allocation of vectors to PFs or VFs and allocation of physical resources to vectors. For example, synchronization 155 can be implemented as firmware programmed into read-only memory, a circuit, or processor-executed software.

Figure 3:
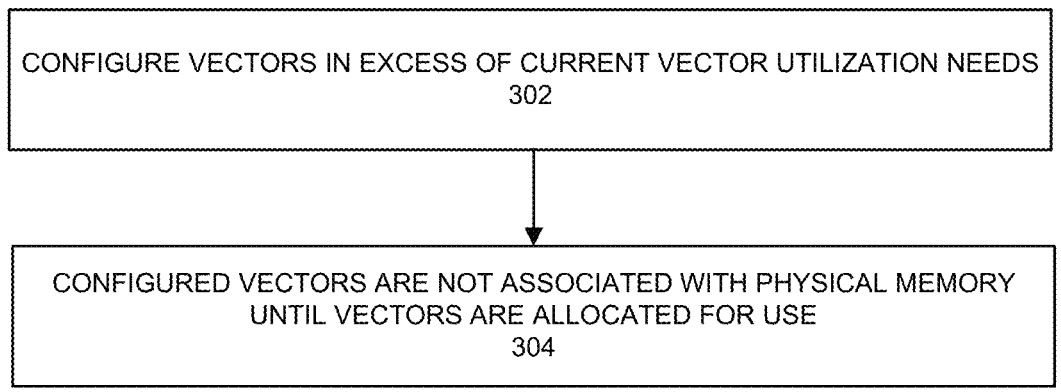
FIG. 3 depicts an example of configuration of a number of available vectors.

FIG. 3 depicts an example of configuration of a number of available vectors. At 302, a number of vectors can be configured in configuration space in excess of current vector utilization needs. For example, the number of vectors can be set regardless of number of queues or class of service and in excess of current vector utilization for any active or even inactive PFs or VFs. For example, in some cases, even if a PF or VF is not active, vectors could be allocated for the PF or VF for future use. In some cases, where a device uses PCIe enumeration, a maximum number of available vectors can be advertised and allocated. For example, under some versions of PCIe, a maximum number of available vectors per function is 2048, although any number of vectors can be allocated such as 512, 1024, 4096, 8192, or any number. For example, more vectors can be allocated than physical resources available to store vector contents. The vectors can be considered Externally Visible Vectors (EVV) and represent available MSI-X vectors.

At 304, the configured vectors are not associated with physical memory space until allocated for use. For example, configuration space can indicate a number of available vectors but any vector is not associated with a physical memory until after a driver (e.g., PF driver or VF driver) requests and is granted use of some vectors.

Figure 4:
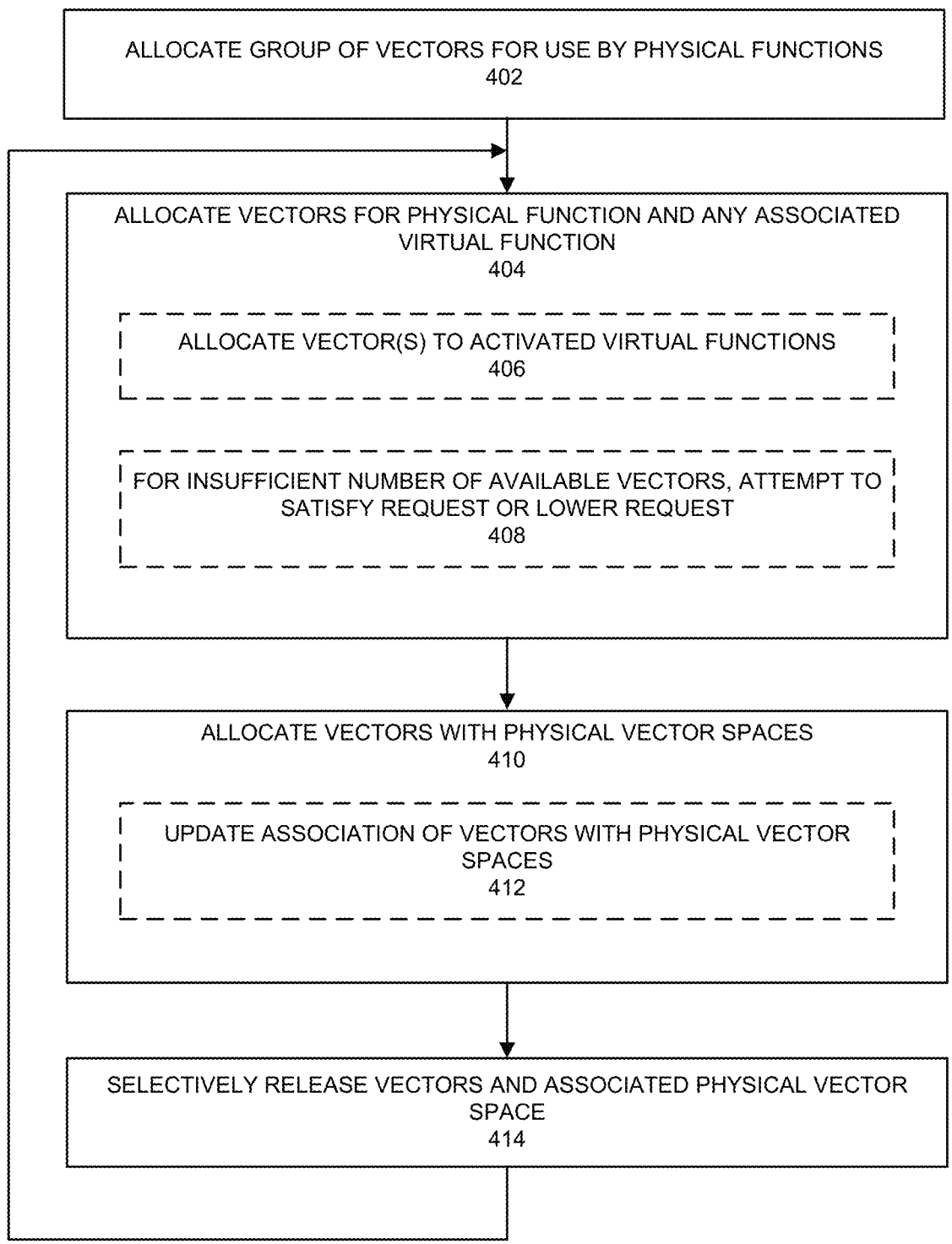
FIG. 4 depicts an example sequence for interrupt allocation.

FIG. 4 depicts an example sequence for interrupt allocation. A synchronization entity (e.g., firmware running on a NIC or a driver) can allocate vector chunks to the various PFs. A PF can allocate vectors to any associated VF. In some cases, a PF can receive additional vectors or free unneeded vectors as to provide for dynamic interrupt vector resource allocation.

At 402, a group of vectors are allocated for use. For example, the vectors can be allocated for use by one or more physical functions. A synchronization point can allocate available vectors to one or more PFs. For example, based on a number of VFs associated with a PF and a number of vectors allocated to a PF, the synchronization point can allocate a number of vectors to the PF. The synchronization point can reserve a number of vectors for each PF regardless of when PF becomes active. In some cases, the synchronization point allocates vectors to a PF according to a chunk of vectors (e.g., 2, 4, 8, 16, 32, 64, 128, 256, 512, and so forth).

At 404, a PF driver allocates physical vectors for use by a PF and any associated VF. Moreover, as any VF becomes active, the PF driver can allocate available vectors to the VF or the synchronization point can allocate available vectors to the VF. For example, the synchronization point can allocate vectors to a PF, and the PF can allocate vectors to a VF. At run-time, a PF driver running on the host can determine the number of vectors needed for a PF and each of its VFs. The PF driver allocates a number of physical vectors for the PF and VFs that it controls. If the PF has a sufficient number of vectors to allocate to the VF, the PF can allocate a number of vectors requested by the VF. The PF driver can allocate MSI-X vectors from vectors available to the PF according to any granularity such that a VF can be allocated any number of vectors according to needs specified by a hypervisor as opposed to receiving a fixed allocation size. The PF driver can allocate any granularity of vectors to VFs (e.g., one vector or odd numbers of vectors).

At 406, vectors can be allocated based on a policy according to usage category of a VF. For example, a set number of vectors can be allocated to any VF where a VF is allocated X number of vectors. A policy-based approach can allocate a number of vectors based on a size of a VF (e.g., a small VF, medium VF, large VF). A small VF can be allocated 8 vectors; a medium VF can be allocated 32 vectors; a large VF can be allocated 128 vectors. As a VF is activated, the hypervisor determines size of vectors given to a VF based on its level of vector differentiation (e.g., causes of interrupts). For example, a small VF can be associated with a virtualized execution environment that uses light network traffic (e.g., computing operations with low network use). A medium VF can be associated with virtualized execution environment that performs a backup operation that uses moderate network accesses but has a medium level of vector differentiation. A large VF can be associated with several virtualized execution environments that share a VF and more vectors for traffic differentiation among the virtualized execution environments. The PF driver can allocate number of vectors based on the level of vector differentiation.

At 408, for an insufficient number of available vectors, an attempt is made to satisfy the request by requesting additional vectors or lowering a requested number of vectors. If the PF has insufficient number of vectors to allocate to the VF, the PF driver can perform one or more of: (1) inform the hypervisor that launched a VF that the interrupts cannot be granted or (2) request additional vectors from the synchronization point. For (1), the hypervisor may reduce a number of interrupts requested for the launched VF. For (2), the synchronization point can allocate a number of vectors on-demand whereby a PF can request additional vectors and the synchronization point grants vectors to the PF if vectors are available. Note that if a vector does not have associated physical vector space, the vector is not allocated to a PF or VF and the PF driver can re-negotiate needed vectors with the hypervisor or synchronization point as in (1) or (2). In some cases, multiple interrupts may share use of a single vector in physical memory if insufficient number of vectors are available.

At 410, allocated vectors are associated with physical vector spaces. In some examples, the synchronization point can permit some mappings of physical vector spaces to vectors to be updated by the PF driver and the PF driver can map available physical vector spaces to allocated vectors, so that one physical vector space or slot is allocated to a single allocated vector. In some cases, the PF driver can request the synchronization point to allocate available physical vector spaces to allocated vectors (e.g., EVVs). The synchronization point may control which EVVs are actually used by the system and can ensure a vector is backed by a physical resource before the vector can be used. Between allocated vectors and physical vector spaces can be scatter-gather or any type of association.

At 412, an association between allocated vectors and physical vector spaces in memory is updated. For example, a look-up-table stored or accessible by a PCIe device can be updated to include association between allocated vectors and physical vector spaces in memory. Physical vectors spaces or resources can refer to one or more of at least one addressable memory region and associated control logic (e.g., timers).

At 414, vectors and associated physical vectors are selectively released. For example, if a virtualized execution environment terminates, is migrated for execution on another CPU core or uses a different PCIe device, the PF driver can release allocated vectors and associated physical vectors. For example, a software process can shut down and relaunch using a VF associated with another PF and the PF driver can release allocated vectors and associated physical vectors. The synchronization point can allocate the released vectors to a PF or VF.

Figure 5:
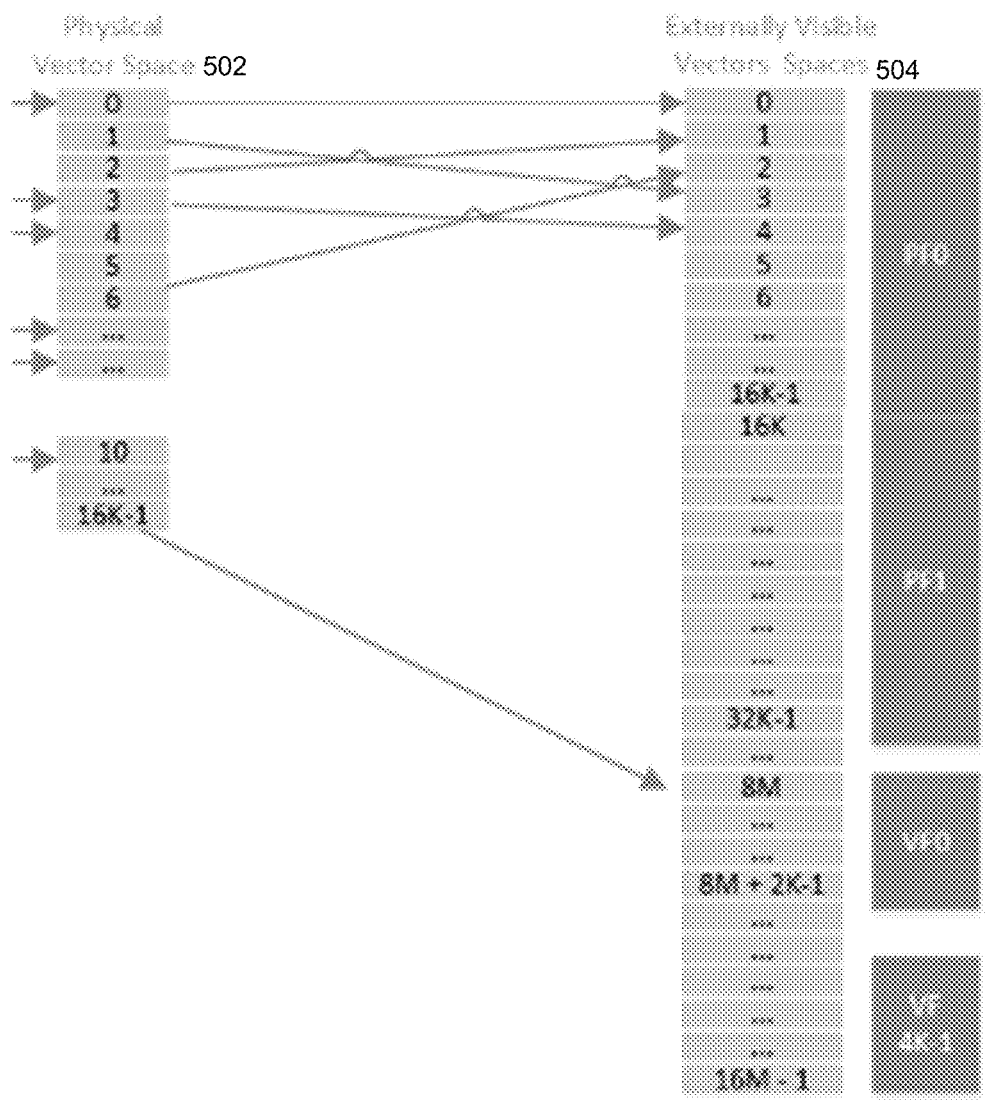
FIG. 5 depicts an example of association between available vectors and physical memory.

FIG. 5 depicts an example of association between available vectors and physical memory. Physical vector space 502 can be allocated in a physical memory device. In some cases, the physical memory device can be content addressable memory (CAM), SRAM or other type of volatile or non-volatile memory. For example, slots 0 to 16K-1 can each represent a region of memory sufficiently large to store information of an interrupt vector, such as an MSI-X vector.

Externally Visible Vectors spaces 504 can refer to advertised available vectors. For example, vectors 0 to 16M-1 can refer to different unique vectors. However, in some examples, vectors allocated to functions (e.g., PF or VF) have associated regions in physical vector space 502. For example, EVV 0 has associated slot 0 in physical vector space 502, EVV 1 has associated slot 2 in physical vector space 502, and so forth.

In this example, SIOV is used and a PF0 is allocated slots 0 to 16K-1, PF1 is allocated slots 16K to 32K-1, VF0 is allocated slots 8M to 8M+2K-1, and so forth. SIOV can allow more than 2048 vectors to be allocated to a function. Functions can be allocated contiguous available vectors but the underlying physical memory spaces can be non-contiguous.

As described earlier, a look-up-table (e.g., CAM-based look-up-table) can be used to indicate mappings of EVV to physical vector space. For example, the look-up-table can be 16K entries with 22 bits per entry to identify a physical vector space slot.

A function (e.g., PF or VF) can receive an interrupt that is written to a specific address in physical vector space 502. An interrupt controller used by a CPU can translate the interrupt and provide the interrupt to the core that runs the function that received an interrupt.

Figure 6:
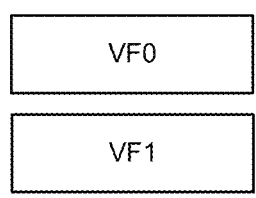
FIG. 6 illustrates an example operation in accordance with some embodiments.
Figure 6:
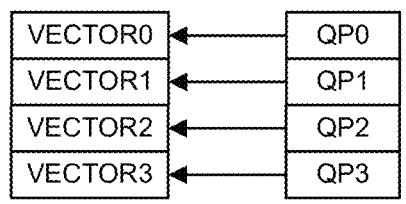
Figure 6:
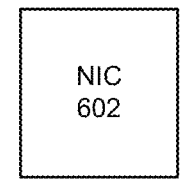
Figure 6:
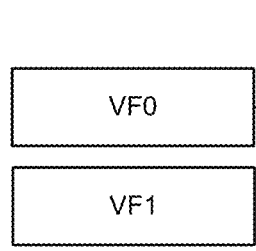
Figure 6:
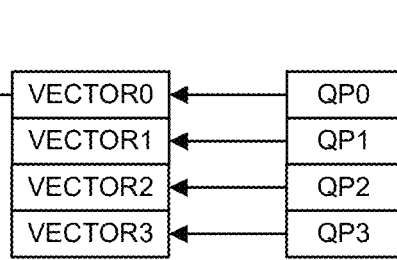
Figure 6:
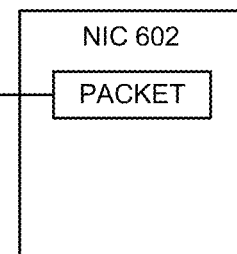

FIG. 6 illustrates an example operation in accordance with some embodiments. In the scenario 600, virtual functions VF0 and VF1 provide an interface with a NIC 602. Virtual functions VF0 and VF1 can be associated with one or more virtualized execution environments (not shown) that run applications or other services and that are to receive notification of events concerning queue pairs updates by NIC 602. For example, VF0 can be associated with a first core and VF1 can be associated with a second core. In this example, VECTOR0 and VECTOR1 are interrupt vectors for VF0 whereas VECTOR2 and VECTOR3 are interrupt vectors for VF1. In this example, an update to a queue pair (QP0) triggers a write to VECTOR0, an update to a queue pair (QP1) triggers a write to VECTOR1, an update to a queue pair (QP2) triggers a write to VECTOR2, and an update to a queue pair (QP3) triggers a write to VECTOR3. Not depicted is that VECTOR0 to VECTOR3 have associated physical address space in which contents of the vectors are written.

Scenario 650 shows an example where a packet is received that is associated with QP0. A corresponding VECTOR0 is updated, which notifies VF0 of the update to QP0. System software can decode VECTOR0 and call the VF driver for VF0. The virtualized execution environment associated with VF0 can process the VECTOR0 from associated physical memory and perform the corresponding action such as copy content of the packet from NIC 602 to a system memory and process the packet.

Some embodiments can be used with homogeneous cores are designed to be the same whereas some embodiments can be used with heterogeneous cores whereby cores are designed to be different and can differ in clock speed, resources, cache size, capabilities, and power use. A high-performance core can perform a task faster than a lower performance or lower power core but uses higher power. In some cases, virtual execution environments that run on higher performance core can be allocated more interrupt vectors than are allocated to lower performance cores that may execute virtual execution environments.

Some embodiments can select a number of interrupt vectors available to a PF or VF based on factors such as traffic type (e.g., latency sensitive, jitter level), bulk traffic category (e.g., backup or email with large attachments and not latency sensitive), mouse flow, elephant flow, east-west data center traffic (within servers of a data center) or north-south data center traffic (into or out of servers in a data center), service level agreements (SLAs). In some embodiments, east-west data center traffic or north-south data center traffic can be subject to security checks to ensure the traffic is authorized and secure. Virtualized execution environments can be prioritized to receive more interrupt vectors to assist in more granular and faster processing of traffic when the virtualized execution environments are associated with one or more of: latency sensitive traffic, mouse flows, east-west data center traffic, more stringent SLAs, or traffic security checks.

Figure 7:
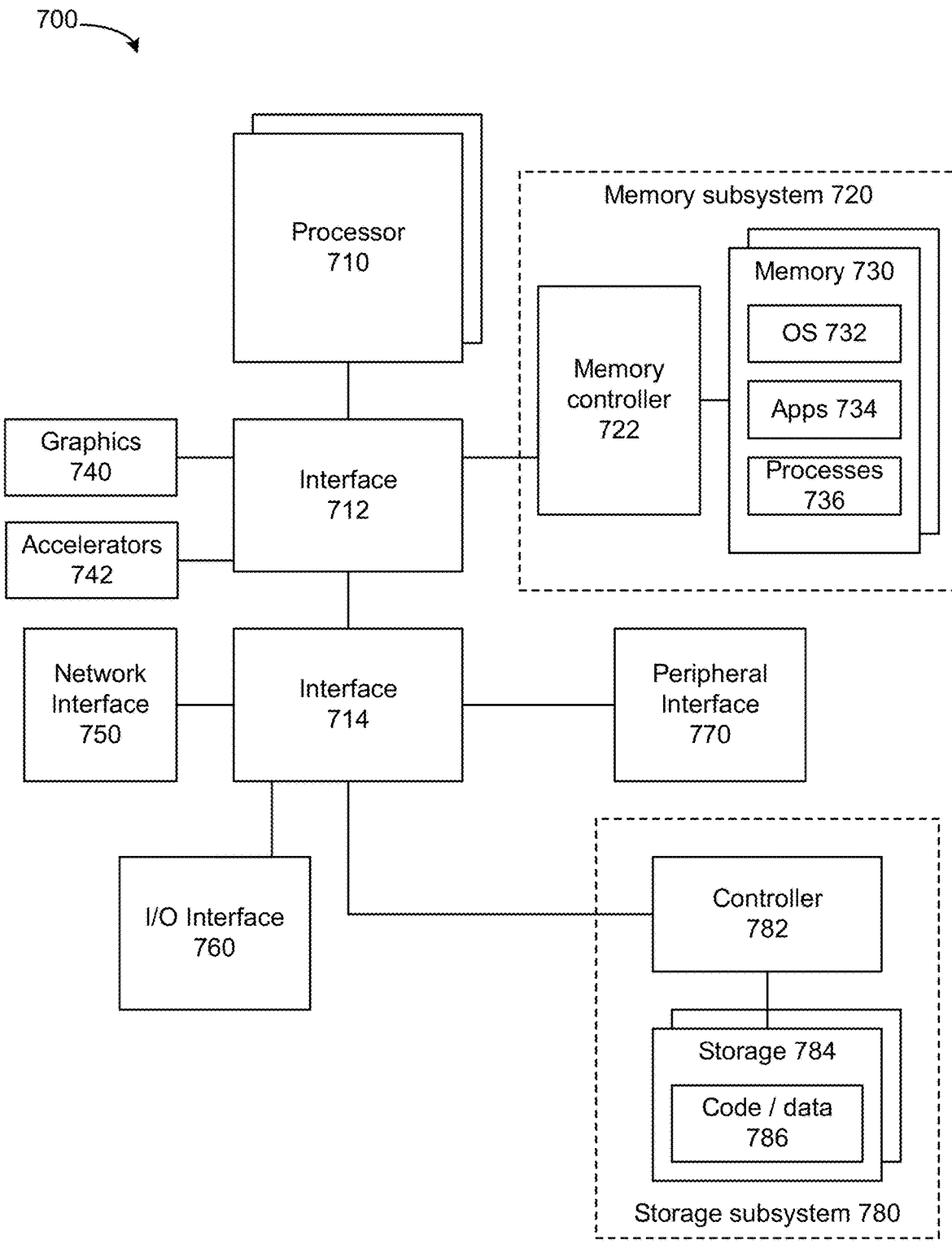
FIG. 7 depicts a system.

FIG. 7 depicts a system. The system can use embodiments described herein to provide extra allocation of interrupt vectors for use by connected devices with less physical memory available to store vectors. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. Various embodiments of network interface 750 use embodiments described herein to receive or transmit timing related signals and provide protection against circuit damage from misconfigured port use while providing acceptable propagation delay.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet, part of the Internet, public cloud, private cloud, or hybrid cloud. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 8:
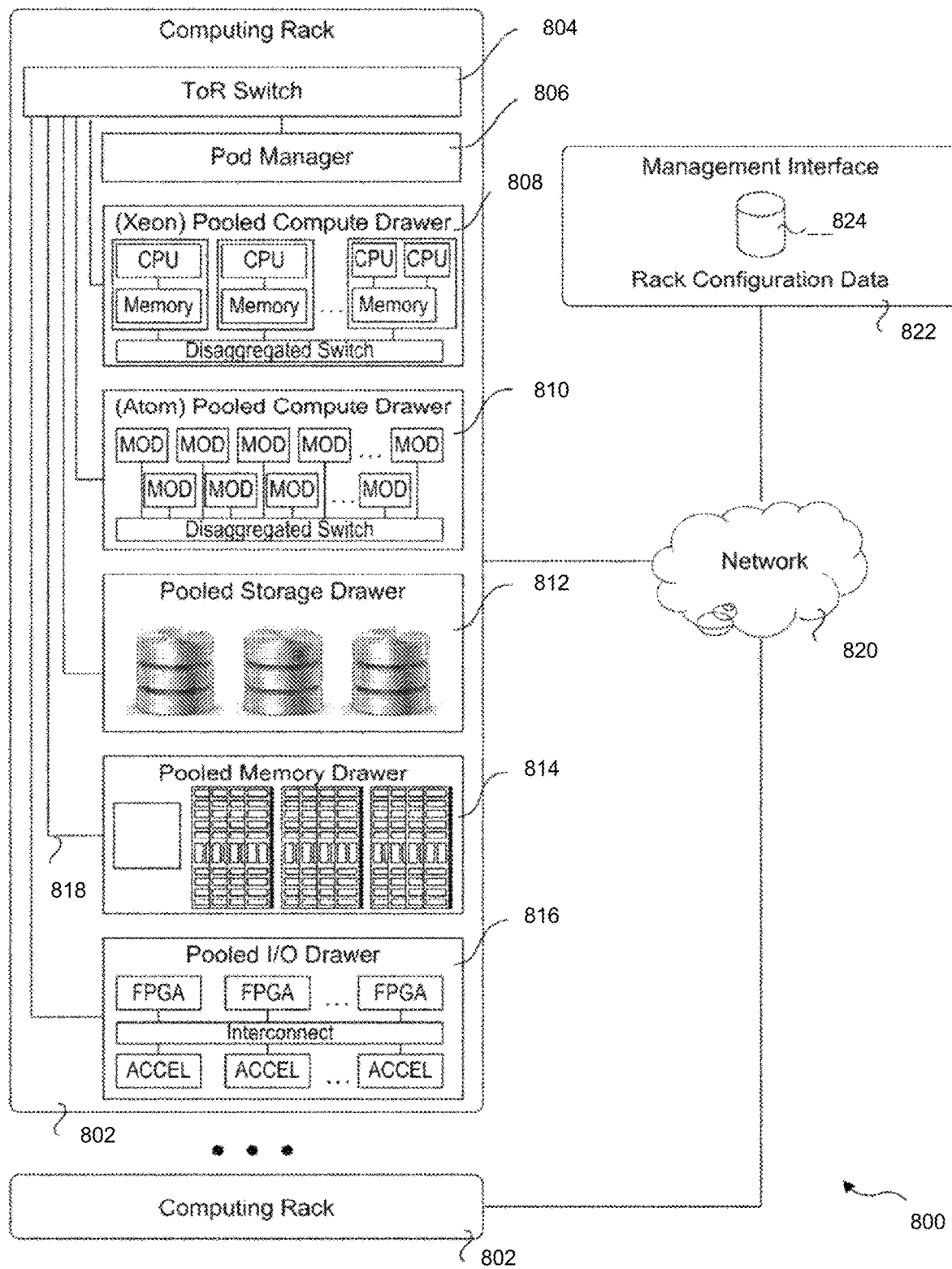
FIG. 8 depicts an environment.

FIG. 8 depicts an environment 800 includes multiple computing racks 802, each including a Top of Rack (ToR) switch 804, a pod manager 806, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 808, and Intel® ATOM™ processor pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link. Computing rack 802 can communicate via network 820 with a management interface 822 to access rack configuration data 824.

Figure 9:
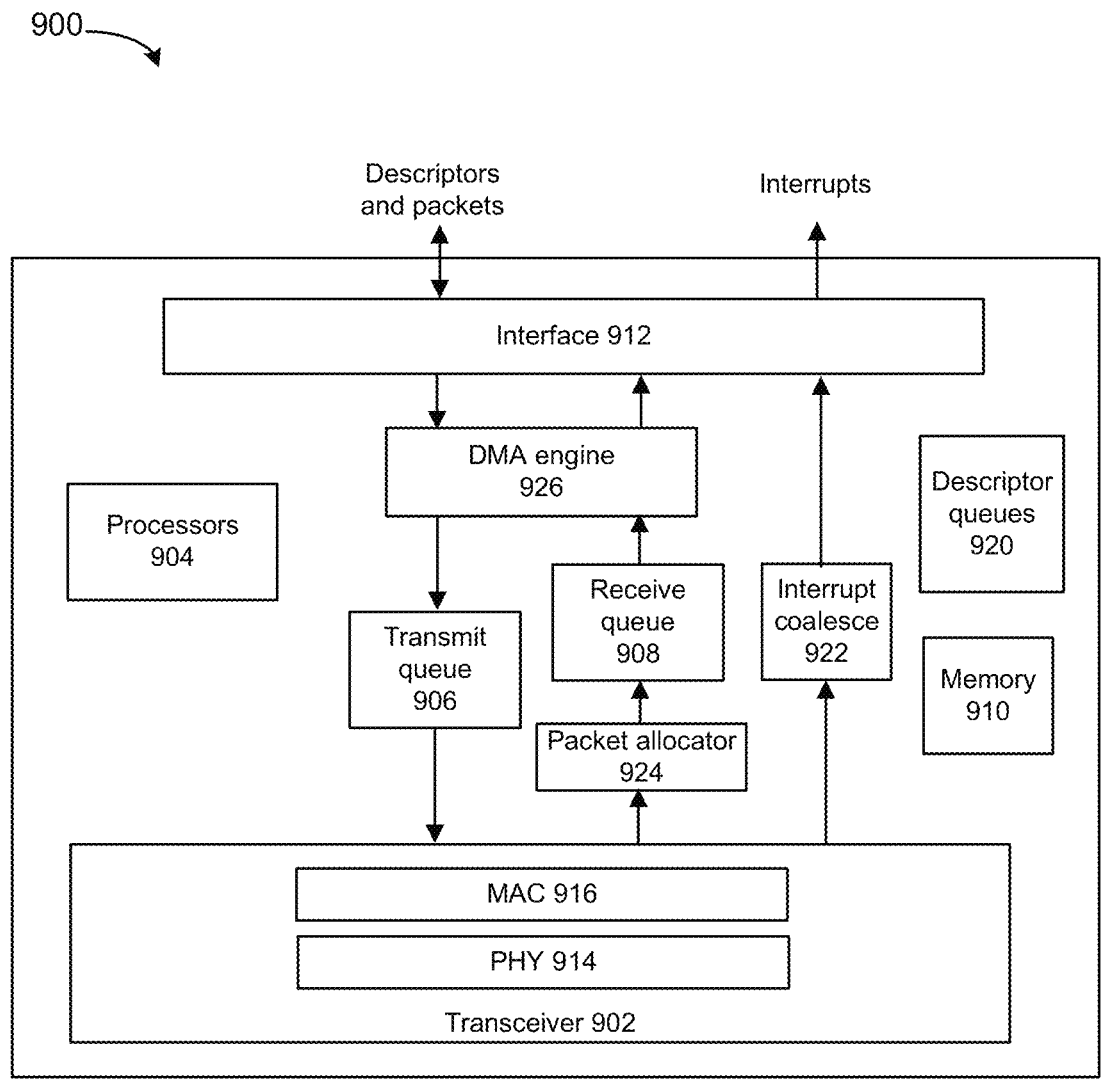
FIG. 9 depicts a network interface.

FIG. 9 depicts a network interface that can use embodiments or be used by embodiments. The network interface can use embodiments described herein to provide extra allocation of interrupt vectors for use to notify host software but with under allocation of physical memory space compared to available vectors. Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any a combination of a: processor, core, graphics processing unit (GPU), field programmable gate array (FPGA), application specific integrated circuit (ASIC), or other programmable hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes a computer-implemented method comprising: indicating a number of available interrupt messages that is more than physical resources available to provide the number of available interrupt messages.

Example 2 includes any example, and includes: a destination entity requesting a maximum permitted allocation of interrupt messages regardless of interrupt message usage and allocating the requested maximum permitted allocation of interrupt messages for use in a configuration region of a device.

Example 3 includes any example, and includes: based on unavailability of a physical resource to provide a first interrupt message, not permitting allocation of the first interrupt message to a destination entity.

Example 4 includes any example, and includes: based on allocation of the one or more interrupt messages to a destination entity, allocating physical resources to provide one or more interrupt messages and the destination entity allocating one or more interrupt messages of the one or more interrupt messages to a subordinate destination entity.

Example 5 includes any example, wherein the destination entity comprises a physical function (PF) or a virtual function (VF) that is to process an interrupt identified by an interrupt message.

Example 6 includes any example, wherein a processor-executed device driver is to perform the allocating physical resources to provide one or more interrupt messages.

Example 7 includes any example, and includes a destination entity requesting additional one or more interrupt messages from among the available interrupt messages; without re-enumerating a peripheral device associated with the interrupt messages, allocating additional one or more interrupt messages to the destination entity; and allocating one or more physical resources to provide the requested additional one or more interrupt messages.

Example 8 includes any example, wherein an interrupt message comprises an MSI-X interrupt message and wherein the indicating a number of available interrupt messages that is more than physical resources available to provide the number of available interrupt messages occurs in a configuration space of a Peripheral Component Interconnect express compatible device.

Example 9 includes an apparatus comprising: a host interface and a peripheral device coupled to the host interface, wherein interrupt messages available for use by the peripheral device are allocated as a first number of interrupt messages to a first entity and a second number of interrupt messages to a second entity, wherein the first number and second number are different.

Example 10 includes any example, wherein an entity is to indicate a maximum number of available interrupt messages in a configuration register space of the peripheral device.

Example 11 includes any example, wherein one or more of: the host interface is compatible with Peripheral Component Interconnect express; a configuration register space of the peripheral device is compatible with Peripheral Component Interconnect express; or an interrupt message comprises an MSI-X interrupt message.

Example 12 includes any example, including a conversion table to indicate a physical resource to store an allocated interrupt message.

Example 13 includes any example, and including one or more of: a network interface, a server, rack, or data center.

Example 14 includes any example, wherein the peripheral device is to: indicate a number of available interrupt messages that is more than physical resources available to provide the number of available interrupt messages.

Example 15 includes any example, and includes a host device comprising a processor, the processor configured to allocate physical resources for one or more interrupt messages in response to allocation of interrupt messages.

Example 16 includes a non-transitory computer-readable medium comprising instructions stored thereon, that if executed by one or more processors, cause the one or more processors to: perform a driver, the driver to: allocate interrupt vectors to one or more destination entities from available interrupt vectors and allocate physical resources for the allocated interrupt vectors in response to allocation of interrupt vectors.

Example 17 includes any example, wherein all of the available interrupt vectors are not allocated resources in physical memory.

Example 18 includes any example, wherein the driver is to: allocate one or more interrupt vectors to at least one secondary destination entity.

Example 19 includes any example, wherein the driver is to: allocate a number of vectors to at least one secondary destination entity based on a usage category of the secondary destination entity.

Example 20 includes any example, wherein the driver is to: selectively release allocated interrupt vectors for use by another destination entity based on termination of a destination entity to which the interrupt vectors are allocated.

What is claimed is:

1. A computer-implemented method comprising:
executing, by a processor, a driver that performs:
indicating a number of available interrupt messages that is more than a number of interrupts with allocated memory resources, wherein at least one of the indicated number of available interrupt messages is not allocated memory resources and
in response to a request for allocation of one or more interrupt messages to a destination entity, allocating memory resources in which to write and read content of the one or more interrupt messages, wherein the destination entity comprises a physical function (PF) consistent with single-root I/O virtualization (SR-IOV).

2. The method of claim 1, comprising:
the destination entity requesting a maximum permitted allocation of interrupt messages regardless of interrupt message usage and
allocating the requested maximum permitted allocation of interrupt messages for use in a configuration region of a device.

3. The method of claim 1, comprising:
based on unavailability of a memory resource to provide a first interrupt message, not permitting allocation of the first interrupt message to the destination entity.

4. The method of claim 1, comprising:
the destination entity allocating one or more interrupt messages of the allocated one or more interrupt messages to a subordinate destination entity.

5. The method of claim 4, wherein the subordinate destination entity comprises a virtual function (VF) that is to process an interrupt identified by an interrupt message.

6. The method of claim 1, comprising:
the destination entity requesting additional one or more interrupt messages from among the available interrupt messages;
without re-enumerating a peripheral device associated with the interrupt messages, allocating additional one or more interrupt messages to the destination entity; and
allocating one or more memory resources to provide the requested additional one or more interrupt messages.

7. The method of claim 1, wherein an interrupt message of the one or more interrupt messages comprises an MSI-X interrupt message and wherein the indicating a number of available interrupt messages that is more than memory resources allocated to provide the number of available interrupt messages occurs in a configuration space of a Peripheral Component Interconnect express compatible device.

8. An apparatus comprising:
a host interface:,
circuitry; and
a peripheral device coupled to the host interface, wherein interrupt messages available for use by the peripheral device are allocated as a first number of interrupt messages to a first entity and a second number of interrupt messages to a second entity, wherein the first number and second number are different, wherein the peripheral device is to indicate a number of available interrupt messages that is more than a number of interrupts with allocated memory resources and wherein in response to a request for allocation of one or more interrupt messages to a destination entity, the circuitry is to allocate memory resources in which to write and read content of the one or more interrupt messages.

9. The apparatus of claim 8, wherein an entity is to indicate a maximum number of available interrupt messages in a configuration register space of the peripheral device.

10. The apparatus of claim 8, wherein :
the host interface is compatible with Peripheral Component Interconnect express (PCIe);
a configuration register space of the peripheral device is compatible with Peripheral Component Interconnect express; and
an interrupt message comprises an MSI-X interrupt message.

11. The apparatus of claim 8, comprising:
a conversion table to indicate a memory resource to store an allocated interrupt message of the first number of interrupt messages.

12. The apparatus of claim 10, comprising one or more of: a network interface, a server, rack, or data center, wherein the peripheral device is coupled to the server, rack, or data center.

13. The apparatus of claim 8, comprising a host device comprising a processor, the processor configured to allocate memory resources for the one or more interrupt messages in response to the request for allocation of one or more interrupt messages to the destination entity.

14. A non-transitory computer-readable medium comprising instructions stored thereon, that if executed by one or more processors, cause the one or more processors to:
execute a driver, wherein execution of the driver to cause:
indicate a first number of available interrupt vectors that is more than a number of interrupts with allocated memory resources, wherein at least one of the indicated first number of available interrupt messages vectors is not allocated memory resources,
allocate a second number of interrupt vectors to one or more destination entities from the indicated first number of available interrupt vectors, and
allocate memory resources for the second number of allocated interrupt vectors in response to the allocation of the second number of interrupt vectors.

15. The non-transitory computer-readable medium of claim 14, wherein the one or more destination entities comprise a physical function (PF) consistent with single-root I/O virtualization (SR-IOV) and wherein the driver is to:
allocate one or more interrupt vectors to at least one secondary destination entity, wherein the at least one secondary destination entity comprises a virtual function (VF) consistent with SR-IOV.

16. The non-transitory computer-readable medium of claim 14, wherein the driver is to:
allocate a third number of vectors to at least one secondary destination entity based on a usage category of the secondary destination entity, wherein the usage category comprises a quality of service and wherein the allocated third number of vectors is based on a level of quality of service so that a higher number of allocated number of vectors is associated with a higher quality of service.

17. The non-transitory computer-readable medium of claim 14, wherein the driver is to:
selectively release allocated interrupt vectors for use by another destination entity based on termination of a destination entity to which the interrupt vectors are allocated.

18. The non-transitory computer-readable medium of claim 14, wherein the allocate memory resources for the second number of allocated interrupt vectors in response to the allocation of the second number of interrupt vectors occurs in response to a demand for interrupt vectors by the driver.

19. The non-transitory computer-readable medium of claim 14, wherein the indicate the first number of available interrupt mesages vectors that is more than a number of interrupt vectors with associated allocated memory resources occurs during Peripheral component interconnect express (PCIe) device enumeration.

20. The non-transitory computer-readable medium of claim 14, wherein the allocate the second number of interrupt vectors to one or more destination entities from the indicated first number of available interrupt vectors occurs without re-enumerating a Peripheral component interconnect express (PCIe) bus.

* * * * *

UNITED STATES PATENT AND TRADEMARK OFFICE
CERTIFICATE OF CORRECTION

| | | |
|---|---|---|
| PATENT NO. | : 12,026,110 B2 | |
| APPLICATION NO. | : 16/814710 | |
| DATED | : July 2, 2024 | |
| INVENTOR(S) | : Linden Cornett et al. | |

It is certified that error appears in the above-identified patent and that said Letters Patent is hereby corrected as shown below:

In the Claims

Column 22, Line 19-24, In Claim 19:
"wherein the indicate the first number of available interrupt mesages vectors that is more than a number of interrupt vectors"
Should read:
wherein the indicate the first number of available interrupt vectors that is more than a number of interrupt vectors Signed and Sealed this
Twentieth Day of August, 2024

Katherine Kelly Vidal
*Director of the United States Patent and Trademark Office*